June 22, 1965 G. J. SCHIFANO ETAL 3,190,247
APPARATUS AND METHOD FOR MANUFACTURING
PLEATED COMPOSITE MATERIAL
Filed March 19, 1963 5 Sheets-Sheet 4

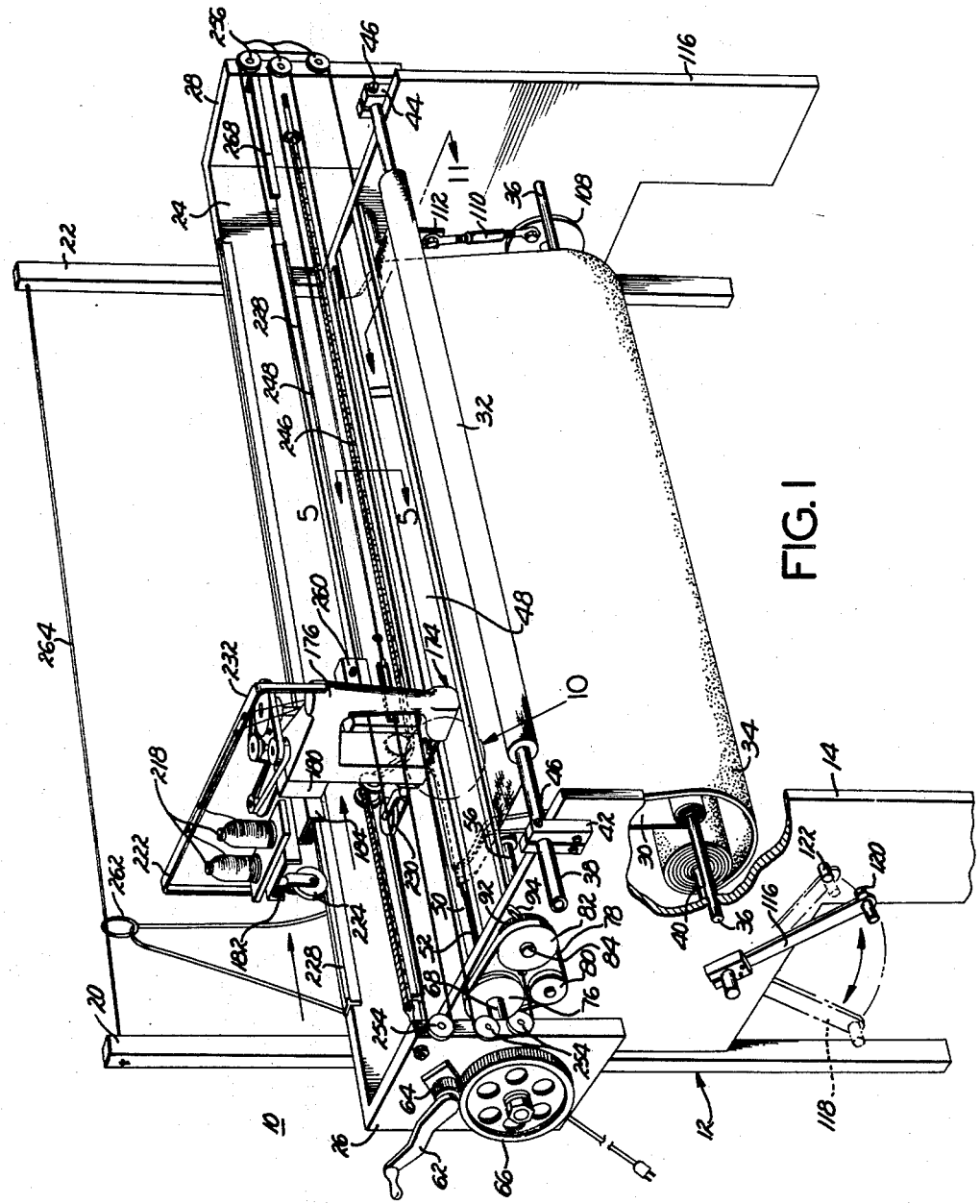

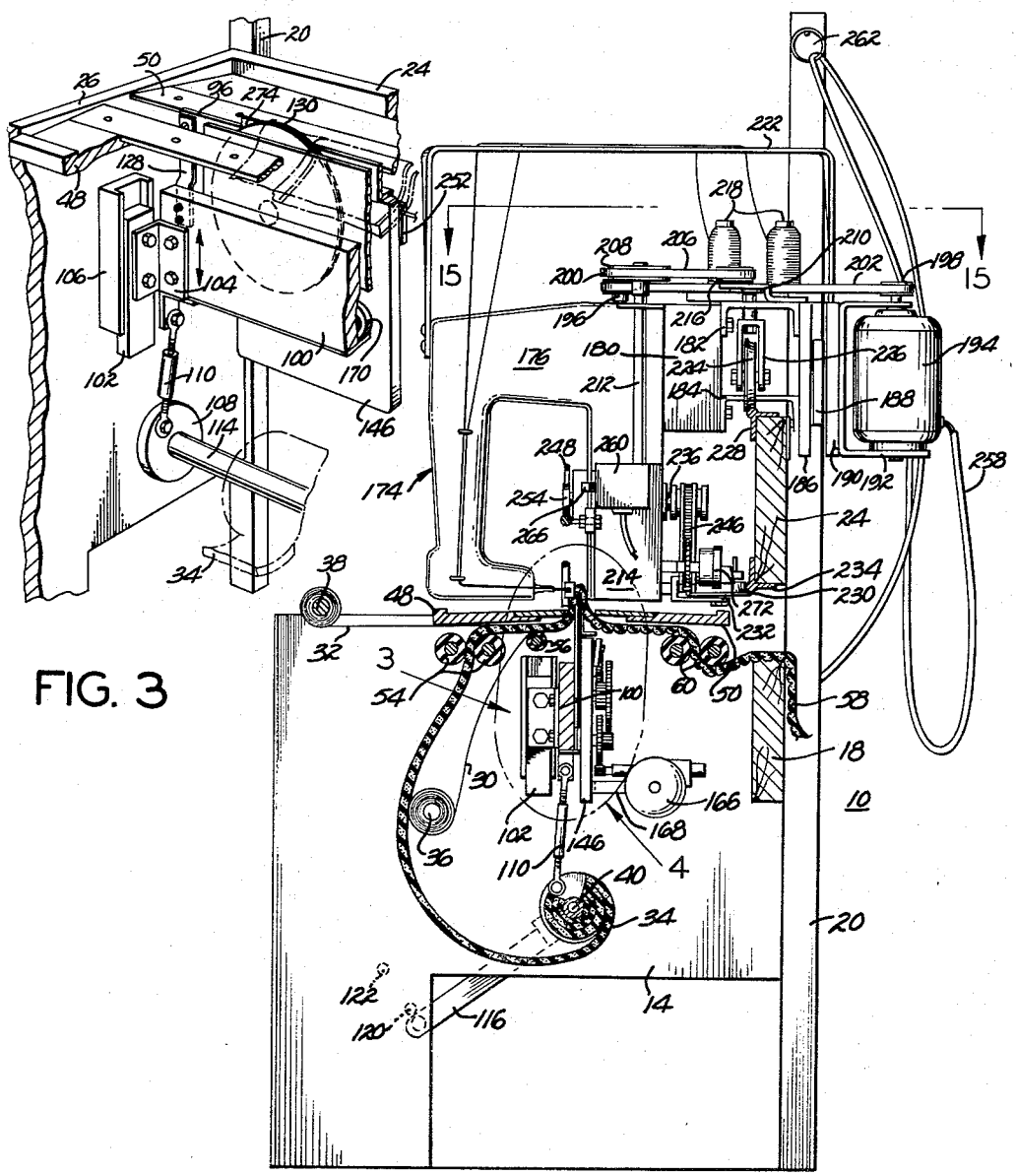

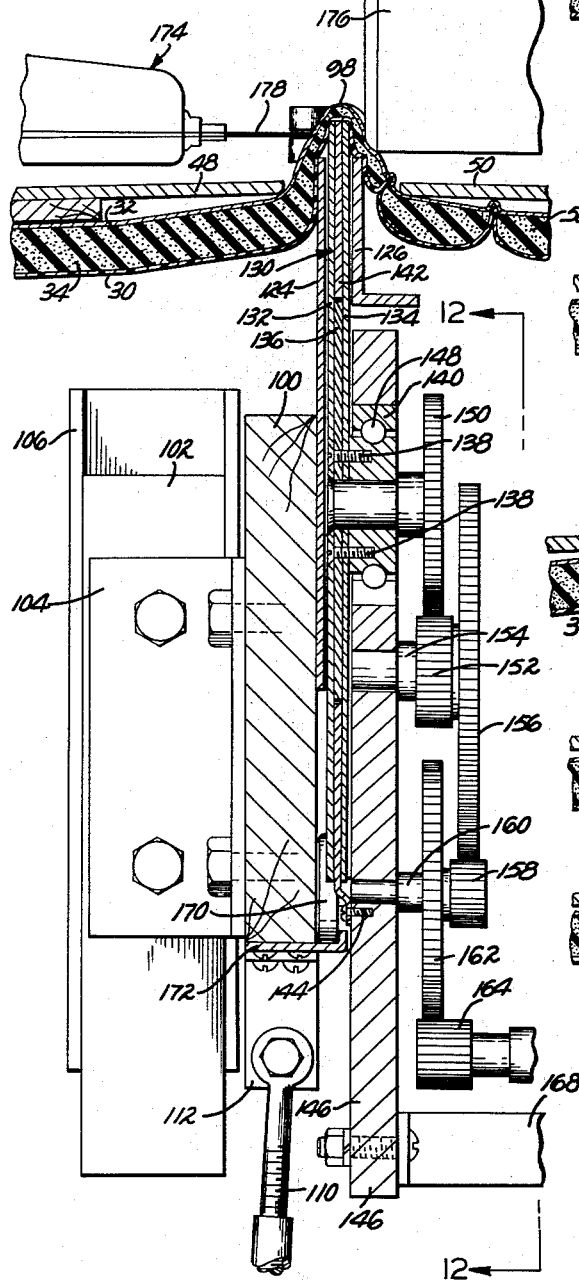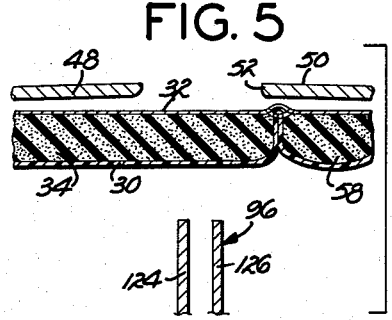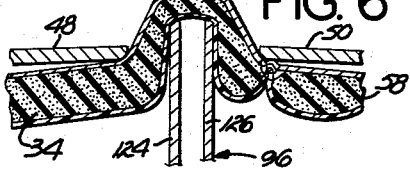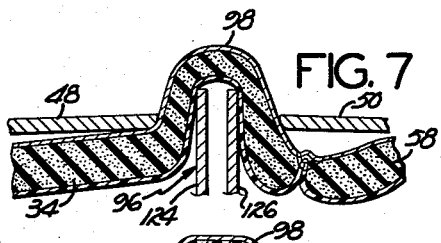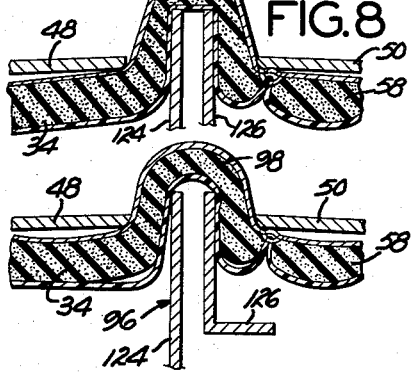

INVENTOR.
GREGORY J. SCHIFANO
JERREL M MORRIS
BY FULWIDER, PATTON,
RIEBER, LEE & UTECHT

ATTORNEYS

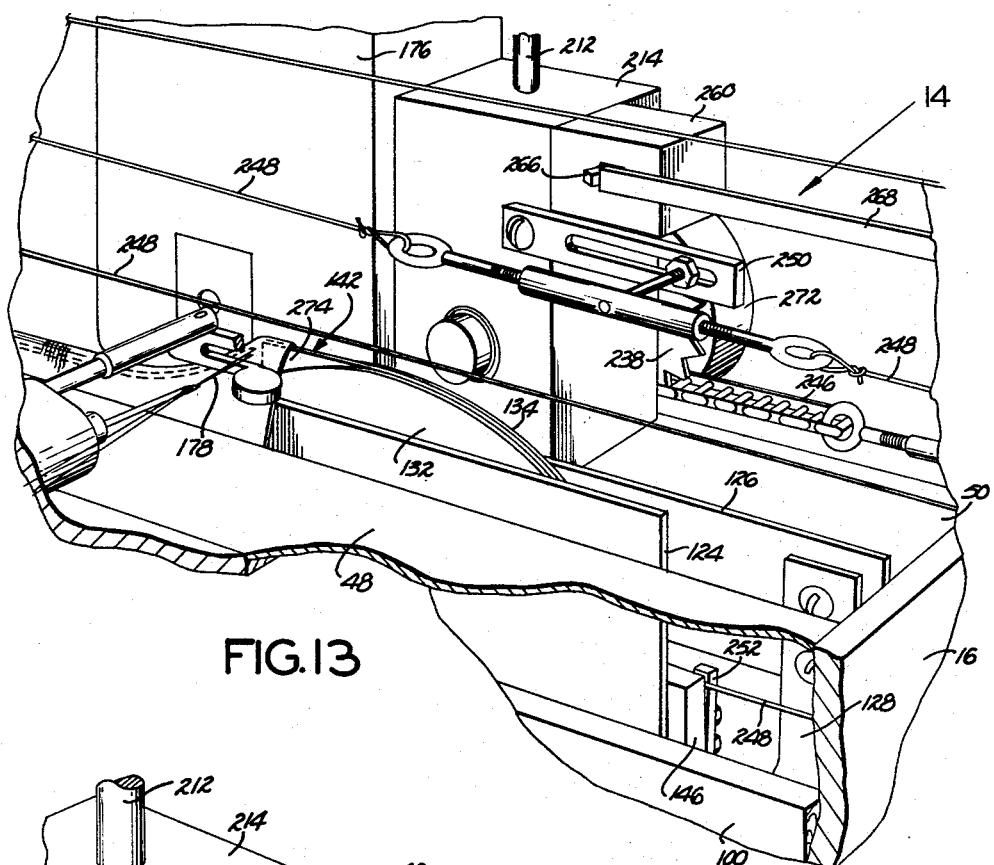
FIG.13
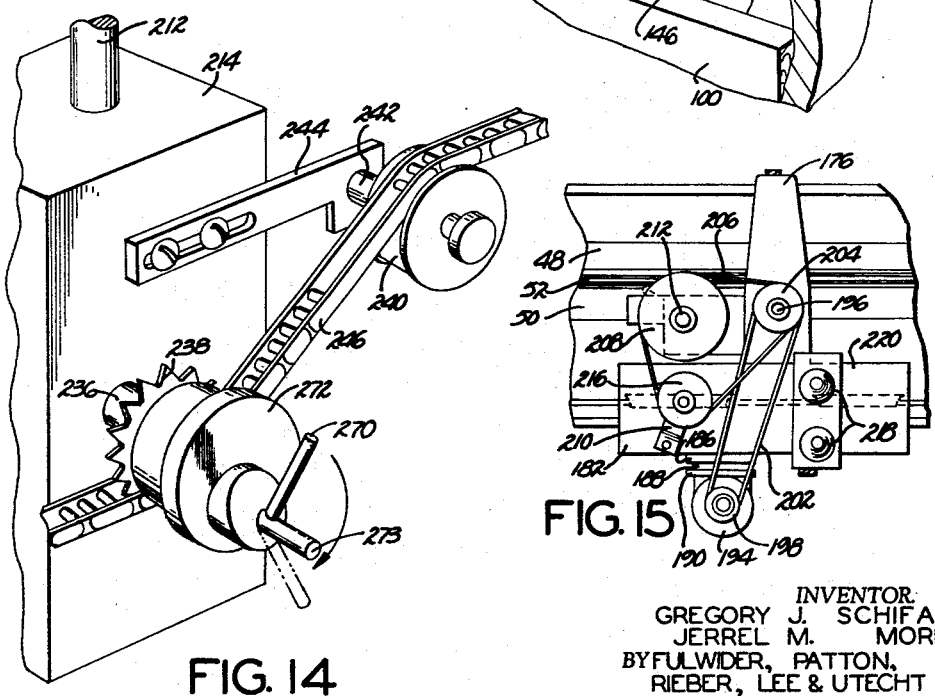
FIG. 14
FIG. 15
INVENTOR.
GREGORY J. SCHIFANO
JERREL M. MORRIS
BY FULWIDER, PATTON,
RIEBER, LEE & UTECHT
ATTORNEYS

3,190,247
APPARATUS AND METHOD FOR MANUFACTURING PLEATED COMPOSITE MATERIAL
Gregory J. Schifano, Arcadia, and Jerrel M. Morris, Sierra Madre, Calif., assignors of thirty-three and one-third percent to Earl H. Belk, Long Beach, Calif.
Filed Mar. 19, 1963, Ser. No. 266,229
8 Claims. (Cl. 112—2)

The present invention relates to an apparatus and method for manufacturing pleated composite material, and more particularly to an apparatus and method for manufacturing pleated upholstery for use in seat cushions and the like.

Pleated upholstery is conveniently of composite structure, being constituted by a tough, outer covering or facing sheet made of plastic material, of leather, or of material simulating the appearance of leather; an opposite covering or facing sheet of muslin lining fabric, and an intermediate, thicker sheet or layer of batting such as rubber or polyurethane foam material. In the prior art, these components are usually hand-sewn or custom-made by stitching together the facing sheets to provide pleats having a deeply stuffed appearance. Such hand manufacture is tedious and time-consuming, and the resultant product is therefore relatively expensive. Moreover, it has been found necessary to mold or cut depressions in the sheet batting to facilitate the formation of the pleats, which additionally adds to the expense of the construction.

In addition to the hand processes of the prior art, there are also apparatuses for substantially automatically making pleated composite material, such as the apparatus described in United States Letters Patent No. 1,171,115, issued to Allister S. Mitchell for "Upholstery-Making Machine and Process." However, the apparatus is not adapted to handle sheet batting, utilizing individual strips of cotton batting which are drawn between the facing sheets contemporaneously with the formation of seam portions therein.

Accordingly, it is an object of the present invention to provide an apparatus and method for manufacturing pleated composite material out of continuous facing sheets and an intermediate continuous sheet of batting made of foam material.

Another object of the invention is to provide an apparatus and method of the aforementioned character which is adapted to produce pleats of uniform appearance and characterized by uniformly parallel seam portions and full, aesthetically attractive pleats.

A further object of the invention is to provide an apparatus and method of the aforementioned character for relatively quickly and inexpensively continuously producing pleated composite material in semi-automatic manner.

Another object of the invention is to provide a method of manufacturing pleated composite material in which the material is gathered to form an elongated seam portion, and the material of the seam portion then tautened by means rolling along the length of the seam portion in progressive engagement therewith and within the interior thereof, thereby obviating the utilization of any holding, clamping, or guiding means on the exterior or outer face of the seam portion. With this arrangement, friction against the unpleated material is greatly reduced and the material is therefore easier to convey and handle so that the formation of uniform pleating is facilitated.

Yet another object of the invention is to provide a method of manufacturing pleated composite material in which elongated lengths of the component materials are fed in a longitudinal direction, the material gathered to form an elongated, transversely oriented seam portion, and thereafter progressively tautened at the seam portion by endless means rolling transversely along the length of the seam portion in progressive engagement with the interior thereof. Such rolling means is preferably constituted by discs or the like driven at a speed slightly greater than the securing means which is provided to secure the seam portion. More particularly, the discs and the securing means, such as a sewing head, travel at the same speed across the component materials for tautening and stitching thereof at the seam portion, but the discs are characterized by a peripheral speed which is slightly greater than that of the coupled sewing head and disc. Moreover, the securing element or needle of the sewing head is preferably located so as to penetrate and stitch the seam portion at a point immediately behind the rotating discs, and a non-rotating guide is preferably associated with the discs to provide a trailing guide portion for holding the seam portion in a tautened condition immediately behind the discs and adjacent the sewing needle.

A further object of the invention is to provide an apparatus for manufacturing pleated, composite material and which utilizes a gathering means for forming a seam portion, and a traveling or rotating means for progressively tautening the seam portion, which means is constituted by a pair of spaced-apart discs between which is disposed a guide plate having a guide portion which trails or extends away from the direction of movement of the discs to maintain the seam portion in tautened condition for stitching by the needle of the sewing head which is located immediately behind such guide portion. With this arrangement, the gathered seam portion is tautened by the non-rotating central guide plate for stitching of the seam portion, and the adjacent rotating discs ride upon the interior of the seam portion, also tautening the same and preventing undesirable differential action upon one side or the other of the seam portion which would otherwise produce undesirable wrinkling and the like.

Another object of the invention is to provide a method of manufacturing pleated composite material, which method includes the steps of gathering the material to form an elongated seam portion, tautening substantially the complete length of the seam portion simultaneously to provide a seam portion of a first depth, slackening the material on one side, again tautening substantially the complete length of the seam portion simultaneously to draw material from the finish or discharge side of the seam portion to deepen the seam portion to a second depth greater than the first depth, releasing or slackening the material, then progressively tautening the material of the seam portion from one end to the other to again deepen the seam portion to the second depth by means rolling along the length of the seam portion in progressive engagement with the interior thereof, and, substantially contemporaneously with the last step, progressively securing together the tautened material from one end to the other thereof immediately behind the rolling tautening means.

A further object of the invention is to provide an apparatus for manufacturing pleated composite upholstery and which includes feed and supply rolls for providing unpleated material to a pleating area, and discharge or finish rollers operative to pull or draw pleated material from the pleating area, and wherein the feed roller and the discharge rollers are selectively operable to provide slack on opposite sides of the pleating area, enabling tautening means at the pleating area to draw slack uniformly from both sides of the pleating area, and thereby avoiding undesirable differential tautening forces productive of unsightly wrinkling of the finished pleated material.

These and other objects and advantages of the present invention will become apparent from the following detailed description, when taken in conjunction with the appended drawings, wherein:

FIG. 1 is a perspective view of an apparatus for manufacturing pleated composite upholstery according to the present invention, portions thereof being cut away for clarity;

FIG. 2 is a side elevational view of the present apparatus, portions thereof being shown in cross-section;

FIG. 3 is an enlarged, fragmentary view of the left end of the apparatus looking in the direction of the arrow 3 of FIG. 2;

FIG. 4 is a fragmentary, enlarged view of the area indicated by the arrow 4 in FIG. 2, and particularly illustrating the gathering means and forming means;

FIGS. 5 through 9 are fragmentary, cross-sectional, and enlarged views of the gathering means, taken along the line 5—5 of FIG. 1, and illustrating successive stages in the formation in the unpleated material of seam portions and intermediate pipes or pleats;

FIG. 13 is an enlarged, fragmentary perspective view of the front of the apparatus, particularly illustrating the manner in which the securement means and the forming means are coupled together;

Figure 10:
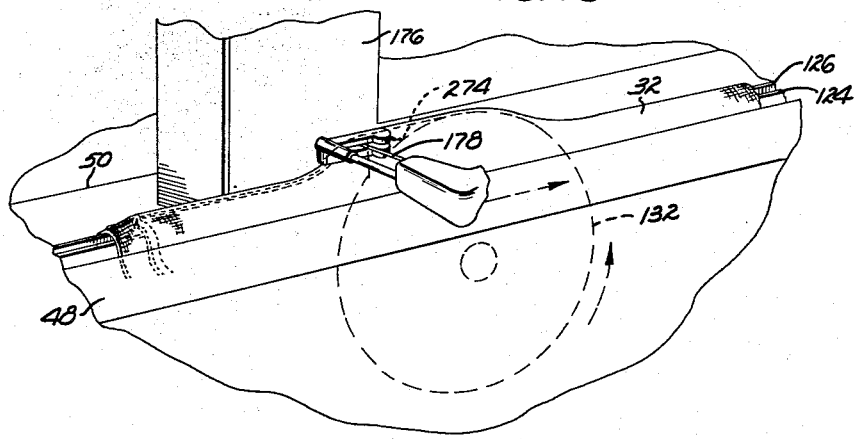
FIG. 10 is an enlarged, fragmentary view of the area indicated by the arrow 10 in FIG. 2, and particularly illustrating the securement means or sewing head and its relative position with respect to the gathering means and the forming means.

FIG. 14 is an enlarged, perspective view of the rear side of the securement means, looking in the direction of the arrow 14 in FIG. 13 and illustrating how the securement means is driven; and FIG. 15 is a fragmentary plan view of the apparatus, taken along the line 15—15 of FIG. 2 and particularly illustrating the motive or drive means for operating the securement means as well as driving the same along the length of the seam portion to be secured.

Referring now to the drawings, and particularly to FIGS. 1 and 2 thereof, there is illustrated an apparatus 10 for manufacturing pleated composite material according to the present invention, and which includes a frame 12 having spaced-apart sides 14 and 16 connected together by a transversely extending brace 18. In addition, a pair of vertically oriented standards 20 and 22 are rigidly secured to the sides 14 and 16 respectively, and extend above the upper margins of the sides 14 and 16, the midportions of the standards 20 and 22 being rigidly secured to a transversely extending track support 24. In addition, a pair of side mounts 26 and 28 are rigidly secured to the opposite extremities of the track support 24 in substantially parallel relationship with the sides 14 and 16, respectively.

The material to be pleated is preferably in the form of elongated sheets of material which are fed from the forward end of the apparatus 10, as viewed in FIG. 1, to the rearward or discharge side thereof, where the finished, pleated upholstery is cut off in suitable lengths. In the present example, the pleated composite material is constituted by a facing sheet or cover material made of leather, simulated leather, or a plastic material such as the material sold in the market under the trademark "Naugahyde." The opposite facing sheet of the composite material is constituted by a lining fabric 32 made of muslin or the like, and a batting 34 is interposed between the cover material 30 and the lining fabric 32, such batting preferably being a foam material such as foam rubber or polyurethane foam plastic.

The cover material 30 is arranged in a roll which is loosely mounted upon a transversely extending shaft 36 having its opposite ends rotatably carried by the sides 14 and 16 whereby the cover material 30 may be relatively freely unrolled from the shaft 36. Similarly, the foam material 34 is loosely arranged upon a transversely extending shaft 38 whose opposite ends are rotatably supported by the sides 14 and 16 whereby the foam material 34 may be relatively freely unrolled from the shaft 38. The lining fabric 32 is also arranged in a roll, but the fabric 32 is tightly wound upon its shaft 40 whereby there is no relative rotation therebetween, and the opposite ends of the transversely extending shaft 40 are disposed through adjustable clamps 42 and 44 mounted to the sides 14 and 16, respectively. Each clamp 42 or 44 is constituted by a pair of elongated elements whose lower extremities are secured to the adjacent side 14 or 16 as the case may be, and whose mid-portions are provided with confronting arcuate openings for receiving one end of the shaft 40. A transverse machine screw 46 is disposed through the upper extremities of the clamp elements of each of the clamps above the shaft 40 so that tightening of the screw 46 causes the clamp elements to frictionally engage the shaft 40, to assure that the lining fabric 32 is withdrawn from the shaft 40 in a taut condition. The reasons for the relatively free feeding of the cover material 30 and the foam material 34, and the constrained feeding of the lining fabric 32, will become apparent from the description hereinafter made.

A pair of substantially horizontally oriented plates 48 and 50 extend transversely across the space between the sides 14 and 16, and have their opposite extremities secured thereto in any suitable manner. The plates 48 and 50 are spaced apart to provide a pleating area constituted by a transversely extending slot 52, the plates 48 and 50 inclining slightly upwardly toward the slot 52 to facilitate feeding of the unpleated material to the pleating area, and conveyance of the pleated material away from the pleating area, as best illustrated in FIG. 2.

The lining fabric 32 is led directly from the shaft 38 to a position beneath the slot 52, while the foam material 34 is led from the shaft 40 upwardly and between a pair of transversely extending feed rolls 54. The foam material 34 then passes over a transversely extending guide rod 56 whose opposite extremities are secured to the sides 14 and 16, from which rod 56 the foam material 34 passes to a position immediately subjacent the lining fabric 32. The cover material 30 is led from the shaft 36 over the guide rod 56 to a position beneath the foam material 34 whereby the foam material 34 is sandwiched between the overlying lining fabric 32 and the underlying cover material 30.

As best viewed in FIG. 2, after the composite material has been pleated, the finished upholstered material, generally designated by the numeral 58, passes between a pair of transversely extending finish or discharge rolls 60. From the rolls 60 the pleated upholstery 58 is carried over the upper edge of the transverse brace 18 and thence to a collection roll (not shown) whereby the pleated upholstery 58 may be cut into convenient lengths, as desired.

Figure 11:
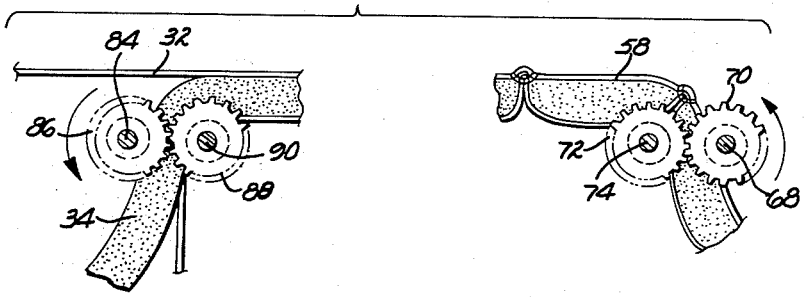
FIG. 11 is an enlarged, diagrammatic view of the feed rolls and discharge rolls, taken along the line 11—11 of FIG. 2, and illustrating their action upon the foam material and the pleated material, respectively.

Referring now to FIGS. 1, 2 and 11, there will next be described the apparatus for operating the feed rolls 54 and the discharge rolls 60. This apparatus is constituted by an operating handle 62 which is rotatably mounted upon the outer face of the side mount 26, and which includes a spur gear 64 which meshes with a shaft gear 66, the gear 66 in turn being rigidly keyed to a shaft 68 which mounts the rearward one of the discharge rolls 60 and has its opposite extremities rotatably carried by the sides 14 and 16. Rotation of the shaft gear 66 and the shaft 68 also causes rotation of a roller gear 70 which is keyed to the shaft 68 adjacent the inner face of the side mount 26. This roller gear 70 is geared to a similar roller gear 72 which is rigidly keyed to a shaft 74 which mounts the other one of the discharge rolls 60 and which has its opposite extremities rotatably carried by the sides 14 and 16. It will be apparent that clockwise rotation of the operating handle 62 as viewed in FIG. 1, is thus effective to pull or draw the pleated upholstery 58 away from the pleating area of the slot 52.

Rotation of the operating handle 62 is also effective to rotate the feed rolls 54 at a speed which is identical to the speed of rotation of the discharge rolls 60. More particularly, the roller shaft 68 also rigidly mounts a pulley 76, and a belt 78 is trained about the pulley 76 and also about an idler pulley 80 and a feed pulley 82. The idler pulley 80 is rotatably mounted to the side 14 of the frame 12, and the feed pulley 82 is freely rotatable upon the adjacent extremity of a transversely extending feed shaft 84 whose opposite ends are rotatably carried by the sides 14 and 16, respectively. As will be apparent, rotation of the shaft 68 is thus effective to rotate the feed shaft 84, the direction of rotation of each being the same.

The feed shaft 84 mounts a feed gear 86 adjacent the inner face of the side mount 26, and this gear 86 meshes with an identical feed gear 88 mounted to a transversely extending feed shaft 90 whose opposite ends are rotatably carried by the sides 14 and 16 of the frame 12. The feed shafts 84 and 90 rigidly mount the feed rolls 54 whereby rotation of the operating handle 62 in a clockwise direction, as viewed in FIG. 1, is operative to positively feed the foam material 34 at the same rate as the pleated upholstery 58 is withdrawn from the pleating area by the discharge rolls 60. However, counter-clockwise rotation of the operating handle 62 is effective only to rotate the discharge rolls 60 because of a slipping or sliding interconnection between the feed pulley 82 and its associated feed shaft 84.

More particularly, a drive wheel 92 is rigidly keyed to the feed shaft 84 between the outer face of the side 14 and the feed pulley 82, the drive wheel 92 being provided with a plurality of peripheral, transversely oriented ridges engaged by a ratchet 94 which is rigidly secured to the feed pulley 82. The ratchet 94 is oriented so as to engage the grooves between the peripheral ridges of the drive wheel 92 when the feed pulley 82 is rotated in a clockwise direction, as viewed in FIG. 1. However, the inclination of the ratchet 94 relative to the ridges on the drive wheel 92 is such that the ratchet 94 rides over the top of the ridges of the drive wheel 92 when the feed pulley 82 is rotated in a counter-clockwise direction.

With this arrangement, when the operating handle 62 is rotated in a counter-clockwise direction, the pleated upholstery 58 is fed backwardly to provide slack in the pleating area, but this movement of the handle 62 is ineffective to alter the position of the foam material 34 inasmuch as the feed rollers 54 are not rotated.

Coming now to a description of the pleating operation, the operation is initiated by gathering means, generally designated by the numeral 96, which is effective to gather the unpleated material, constituted by the cover material 30, the lining fabric 32, and the foam material 34, and form the same into an elongated seam portion 98, as best illustrated in FIGS. 5 through 9.

The gathering means 96 comprises a transversely extending vertically oriented mounting plate 100, which, as best viewed in FIGS. 3 through 9 and 13, is rigidly secured at its opposite ends to a pair of vertically movable slides 102 by a pair of angles 104.

Each of the slides 102 is vertically movable within a vertically oriented channel 106 which is affixed to the inner face of the adjacent side 14 or 16, as the case may be. The mounting plate 100 is thus vertically slidable relative to the frame 12, the slidable movement thereof being effected by partial rotation of a pair of eccentrics 108. A turnbuckle 110 is pivotally secured to each eccentric 108 at one extremity, and at its opposite extremity is pivotally secured to a depending angle 112 which is affixed to the lower edge of the mounting plate 100.

The two eccentrics 108 are connected for common rotation by a transversely extending eccentric shaft 114 whose opposite ends are rotatably carried by the sides 14 and 16. One end of the eccentric shaft 114 extends through the frame side 14 and fixedly mounts a handle 116. As best illustrated in FIG. 1, the handle 116 is movable from a lower position, indicated in phantom outline at 118, to an intermediate position in which the handle 116 engages a first stop 120 mounted to the side 14, and thence to a position of engagement with a second stop 122 secured to the side 14 above or beyond the stop 120. The handle 116 is moved from the stop 120 to the stop 122 by biasing the handle slightly outwardly to clear the stop 120.

Manipulation of the handle 116 from the lower position 118 to the first stop 120 and thence to the second stop 122 effects movement of a pair of parallel, spaced apart and transversely extending gathering plates 124 and 126 to the positions illustrated, respectively, in FIGS. 5, 6, and 8. The plates 124 and 126 form part of the gathering means 96, the plate 124 being directly secured adjacent its lower edge to the rearward side of the transversely extending mounting plate 100 while the plate 126 is secured to the mounting plate 100 by a pair of straps 128 which are deformed or offset toward the plate 100 to space the plate 126 from the plate 124.

The upper edges of the plates 124 and 126 preferably both lie in the same horizontal plane for simultaneous engagement with the underside of the unpleated materials to form the seam portion 98, as will be more completely described hereinafter.

A forming means 130 is mounted upon the plate 100 of the gathering means 96 for vertical movement therewith and, as best viewed in FIG. 4, comprises a pair of thin circular discs 132 and 134 which are spaced apart by an intermediate spacer disc 136. The discs 132, 134, and 136 are rigidly mounted by conventional machine screws 138 to a central rotatable hub 140 so as to rotate therewith, the discs 134 being of the same diameter, while the spacer disc 136 is of a lesser diameter. An annular, non-rotatable guide plate 142 is interposed between the discs 134 radially outwardly of the spacer disc 136 and includes a downwardly extending portion secured by a plurality of machine screws 144 to a mounting plate 146, the guide plate 142 being deformed slightly inwardly toward the plate 146 for this purpose.

The upper edge of the guide plate 142 is curved to provide an edge having a diameter preferably the same as that of the pair of discs 134 so as to engage the seam portion 98 therewith. In addition, when the mounting plate 100 is moved upwardly, the guide plate 142 and the discs 134 extend upwardly between the gathering plates 124 and 126 with sufficient clearance so that the discs 132 and 134 are rotatable relative to the plates 124 and 126, and the spacer disc 136 permits relative rotation between the guide plate 142 and the discs 132 and 134.

The hub 140 to which the discs 132, 134, and 136 are mounted is secured to the inner race of a ball bearing 148 provided in the mounting plate 146, the hub 140 being rotatable by a gear train constituted by a gear 150 mounted to the hub 140, a spur gear 152 mounted upon a shaft 154 which is rotatably mounted to the plate 146, a gear 156 fixed to the shaft 154, a spur gear 158 which is fixed to a shaft 160 rotatably mounted to the plate 146, a gear 162 also fixed to the shaft 160, and a drive gear 164 which is rotated by a drive motor 166.

The drive motor 166, which is rigidly mounted to the mounting plate 146 by a bracket 168, is operative by connection to a suitable power source to rotate the discs 134 and the guide plate 142, the gear train connected therewith reducing the speed of rotation of the motor 166 to a predetermined slower rate for the discs 134, although it will be apparent that a slower speed drive motor 166 could be utilized, if desired, and the gear train eliminated.

The forming means 130 is mounted for rolling movement along the length of the mounting plate 100 of the gathering means 96 by a pair of rollers 170, one of which is illustrated in FIG. 4. The rollers 170 are rotatably mounted in transversely spaced apart relationship at opposite extremities of the mounting plate 146, and supported for rolling movement by a track 172 which is secured to the lower edge of the mounting plate 100. The track 172 includes a lip coextensive therewith to prevent the rollers 170 from running off the track 172.

The forming means 130 is moved along the track 172 by a securement means 174 to which it is coupled, as will become apparent hereinafter. The securement means 174, as best seen in FIGS. 1 and 2, includes a sewing head 176 of any conventional construction adapted to provide a lock stitch or the like in the seam portion 98. The head 176 does not form a part of the present invention and therefore will not be described in detail.

The sewing head 176 is mounted so that the needle 178 thereof is oriented in a substantially horizontal plane to facilitate penetration of the substantially vertically oriented seam portion 98 when the same is disposed through the slot 52 for securement. The sewing head 176 forms a part of a sewing head carriage which includes a mounting structure for supporting the sewing head 176 upon the track support 24. More particularly, the upper base portion of the sewing head 176 is secured to a support block 180 which is rigidly fixed to a pair of vertically spaced apart and horizontally oriented U-shape channels 182 and 184 which are secured to a vertically oriented plate 186.

A spacer plate 188 is secured to the plate 186 and is also secured to a motor mounting plate 190 which rigidly carries a C-shaped mounting bracket 192 to which a drive motor 194 is rigidly mounted.

The drive motor 194 is adapted to rotate an operating shaft 196 to operate the sewing head 176, being connected thereto by means of a drive pulley 198 which is rotatable with the armature of the motor 194, a driven pulley 200 which is rotatable with the sewing head operating shaft 196, and a belt 202 connecting the pulleys 198 and 200.

The operating shaft 196 also mounts a pulley 204 which is connected by a belt 206 to a transverse pulley 208 keyed to the upper extremity of a drive shaft 212 whose lower extremity extends into a gear box 214 secured to one side of the sewing head 176. The belt 206 is also trained about an idler pulley 216 which is rotatably carried by a bracket 210 secured to the channel 182. Thus, the motor 194 is effective to operate the sewing head 176 as well as rotate the drive shaft 212 for the purpose of causing the sewing head 176 to traverse the pleating area constituted by the slot 52, as will be come apparent hereinafter.

Usual thread spools 218 are also mounted to the channel 182 by a bracket 220, the threads thereof being guided by a thread guide 222 of inverted U-shape which is connected at one extremity to the bracket 220 and at the other extremity to the sewing head 176.

The sewing head assembly is supported for rolling movement by a pair of grooved wheels 224 which are rotatably supported by wheel mounts 226 secured to the underside of the channel 182. The wheels 224 engage and roll upon a corner bead of a transversely extending angle or track 228 which is secured to the upper forward corner of the track support 24. The wheels 224 are vertically oriented to carry vertical loads, while horizontal loads are carried by a horizontally oriented wheel 230 which is rotatably supported by a wheel mount 232 secured to the inner side of the gear box 214. The wheel 230 is also grooved and rides upon a corner bead of a transversely extending angle or track 234 which is secured to the lower front corner of the track support 24.

Although not shown, the gear box 214 contains a pair of meshing bevel gears, one of which is secured to the lower end of the drive shaft 212 and the other of which is secured to a stub shaft 236 which rotatably mounts a chain sprocket 238, as best viewed in FIG. 14. Another chain sprocket 240 is rotatably mounted to a stub shaft 242 which is secured by a bracket 244 to the rear face of the gear box 214.

A stationary, transversely extending chain 246 is connected at its opposite extremities to the side mounts 26 and 28, and is led beneath the chain sprocket 238 and above the chain sprocket 240 to provide improved peripheral engagement between the chain sprocket 238 and the chain 246. Operation of the drive motor 194 rotates the drive shaft 212 and the chain sprocket 238 in a clockwise direction, as viewed from the front of the present apparatus, to cause the sewing head 176 to traverse the pleating area constituted by the slot 52, traversing the same from left to right.

Figure 12:
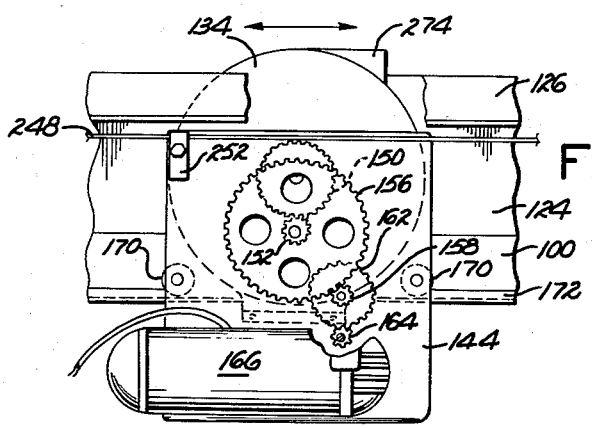
FIG. 12 is an enlarged, detail view of the rear side of the forming means, taken along the line 12—12 of FIG. 4.

The forming means 130 is coupled to the sewing head 176, as best illustrated in FIGS. 1, 12, and 13, by an endless cable 248 which is secured to the forward face of the gear box 214 by a bracket 250, and to the mounting plate 146 of the forming means 130 by a bracket 252. The cable 248 is trained in a continuous series of loops about three pulleys 254 rotatably carried at the forward edge of the side mount 26 and three pulleys 256 rotatably mounted to the forward edge of the side mount 28 whereby movement to the right of the sewing head 176, as viewed in FIG. 1, is effective to cause corresponding movement of the forming means 130 to the right, it being noted that the gear train connected to the drive motor 166 of the forming means 130 causes rotation of the discs 134 at a predetermined peripheral rate which is slightly greater than the traversing rate of the sewing head 176.

The drive motor 194 is electrically connected in series with a switch box 260 which is mounted to the right side of the gear box 214, as best viewed in FIGS. 1 and 13, and the box 260 connected to a suitable power source by a cable 258 which is trained through a ring 262. The ring 262 is transversely slidable upon a wire 264 carried at the upper extremities of the standards 20 and 22 so that power can be provided to the moving sewing head 176. The switch box 260 is operated by a switch 266 which is automatically actuated to cut off power to the motor 194 when the sewing head 176 has completed a traversing movement. This is accomplished by a transversely extending actuator bar 268 which is fixedly mounted to the side mount 28, and which engages the switch 266 to close the same when the sewing head 176 has reached its extreme right-most position, as viewed in FIG. 1.

The apparatus 10 is preferably operated by a method including the steps of operating the handle 116 to the position outlined at 118 in FIG. 1 to thereby move the gathering means 96 to the downward position illustrated in FIG. 5; and rotating the handle 62 in a clockwise direction to advance the foam material 34 toward the slot 52 and simultaneously pull the already pleated material away from the slot 52 and pull fresh or unpleated lining fabric 32 and cover material 30 toward the slot 52.

According to the preferred method of operation of the apparatus 10, the unpleated material is then gathered by moving the handle 116 into engagement with the first stop 120, which raises the gathering means 96 to the position illustrated in FIG. 6, thereby tautening the unpleated materials along the complete length of the slot 52 to form a seam portion 98. Since the cover material 30 and lining fabric 32 are loosely mounted upon their associated shafts, this action of the gathering means provides slack from the supply side of the pleating area. All of the unpleated materials are substantially taut at this point, but it is noted that the foam material 34 is not stretched since it is positively fed by its rolls 54.

Next, the handle 62 is rotated in a counter-clockwise direction, rotating only the discharge rolls 60 to provide slack on the discharge side of the pleating area. This step, together with the previous step, provides slack on both sides of the gathering means 96 so that when the gathering means 96 is subsequently further raised, slack will be drawn equally from both sides of the pleating area and undesirable wrinkling avoided. This is an important feature of the present invention in that it has been found that the materials to be pleated, as well as the already pleated material, do not easily slide over the gathering plates 124 and 126 and care must be taken to equalize the slack on each side thereof if wrinkling of the material is to be avoided.

The handle 116 is then moved to engage the stop 122, which raises the gathering plates 124 and 126 to the position illustrated in FIG. 8, which takes the slack out of the adjacent materials and forms a seam portion 98 along the length of the slot 52 which is deeper than the seam portion formed during the step illustrated in FIG. 6. It is noted that the height of the gathering plates 124 and 126, as illustrated in FIG. 8, is the height at which the forming means 130 operates during the sewing operation, as will be seen.

The handle 116 is then moved into engagement with the stop 120 to bring the gathering plates 124 and 126 down to the position illustrated in FIG. 9. In this position there is limited slack in all of the materials to be pleated.

The sewing head 176 is then moved manually to the left of the apparatus 10 into engagement with the left edge of the lining fabric 32 which, as best illustrated in FIG. 10, is wider than the cover material 30 and foam material 34 so that the sewing head 176 can begin stitching on the lining fabric 32 before engaging the other materials. Manual movement of the sewing head 176 to the left is permitted by a clutch arrangement, as best seen in FIG. 14, constituted by a clutch 272 keyed to the shaft 236. More particularly, the chain sprocket 238 is freely rotatable upon the shaft 236 and rotates with the shaft 236 only when an operating pin 270 is rotated into the full line position illustrated in FIG. 14 to move a pin 273 into an opening therefor in the sprocket 238. However, when the pin 270 is rotated to the dotted position of FIG. 14, the pin 273 is withdrawn from the chain sprocket 238, permitting it to rotate freely and independently of the shaft 236 so that the sewing head 176 may be manually moved without the constraint of the bevel gears in the gear box 214.

The stitch 266 is next operated to start the motor 194, causing the forming means to move with the sewing head 176 and pass from its position in engagement only with the lining fabric 32 into engagement with the underside of the seam portion 98 of all of the materials to be pleated, tautening them progressively along the length thereof to the depth illustrated in FIG. 8. The faster peripheral rate of the discs 134 facilitates this movement from the lining fabric 32 to a position subjacent the cover material 30.

Contemporaneously, the needle 178 of the sewing head 176 stitches the tautened materials just behind a trailing guide portion 274 which is integral with the guide plate 142. The upper edge of the guide portion 274 is substantially horizontally oriented and terminates in a vertical edge behind which the sewing needle 178 operates, it being noted that the guide portion 274 extends or trails outwardly of the periphery of the rotating discs 134 to facilitate support of the seam portion 98 for stitching thereof.

When the sewing head 176 and the forming means 130 have reached the end of their run at the right of the machine, as viewed in FIG. 1, the actuator bar 268 shuts off the switch 266. The operator then cuts the threads from the needle 178, lowers the gathering means 96, and manually moves the sewing head 176 back to the left of the apparatus 10 to commence another run. It is noted that the degree of rotation of the operating handle 62 for each of the steps of the above-described method depends upon the width of pleats desired, and the nature of the material to be pleated. However, this is a matter requiring only initial slight experimentation, and suitable stops and the like can be provided for subsequent production runs, as will be apparent to those skilled in the art.

Thus, the present apparatus 10 is operative to gather and form a composite material to be pleated. The material is gathered to provide equal slack on each side of the rotating discs 134 and the non-rotating guide plate 142 whereby undesirable wrinkling is substantially eliminated. Moreover, the gathering and forming of the material is from the underside only, and undesirable friction on the upper side of the seam portion 98 is completely absent.

Various modifications and changes may be made with regard to the foregoing detailed description without departing from the spirit of the invention or the scope of the following claims. In particular, it is contemplated that a form of securement means other than the sewing head 176 may be utilized if desired. For example, where the unpleated materials are all adapted to be heat fused, a spot or seam "welding" securing means may be employed, the term "welding" being intended to describe the melting and fusion of thermoplastic materials and the like.

We claim:
1. In a method of manufacturing pleated composite material, the steps comprising:
  constraining said material against movement adjacent one side of an elongated area of said material;
  tautening said material in said area along the length thereof to provide a seam portion of a first depth;
  gathering said material from said one side and providing slack in said seam portion;
  constraining said material against movement adjacent said one side of said seam portion;
  tautening said seam portion to draw material from the side of said seam portion opposite said one side to deepen said seam portion to a second depth greater than said first depth;
  releasing said material to slacken said seam portion;
  progressively tautening said material of said seam portion to again deepen said seam portion to said second depth by means rolling along the length of said seam portion in progressive engagement with the interior thereof;
  and progressively securing together said tautened material immediately adjacent said means.

2. In a method of manufacturing pleated composite material, the steps comprising:
  feeding an elongated length of said material in a longitudinal direction;
  gathering said material and forming an elongated, transversely oriented seam portion;
  constraining said material against movement adjacent one side of said seam portion;
  tautening substantially the complete length of said seam portion simultaneously to provide a seam portion of a first depth;
  slackening said material on said one side and providing slack in said seam portion;
  constraining said material against movement adjacent said one side of said seam portion;
  tautening substantially the complete length of said seam portion simultaneously to draw material from the side of said seam portion opposite said one side to deepen said seam portion to a second depth greater than said first depth;
  releasing said material to slacken said seam portion;
  progressively tautening said material of said seam portion from one end to the other thereof to again deepen said seam portion to said second depth by means rolling along the length of said seam portion in progressive engagement with the interior thereof;
  and progressively securing together said tautened material from one end to the other thereof immediately behind said means.

3. In a method of manufacturing pleated upholstery comprising an elongated section of foam material and facing sheets, the steps comprising:

positively feeding said foam material in a longitudinal direction toward a pleating area and simultaneously positively drawing already pleated upholstery away from said pleating area;

constraining said already pleated upholstery against movement toward said pleating area and simultaneously constraining said foam material against movement toward said pleating area;

tautening said foam material and said facing sheets in said pleating area to provide an elongated seam portion of a first depth;

slackening said pleated upholstery beyond said pleating area to provide salck in said seam portion;

constraining said pleated upholstery against movement toward said pleating area and simultaneously constraining said foam material against movement toward said pleating area;

tautening said seam portion to draw said facing sheets toward said pleating area and deepening said seam portion to a second depth greater than said first depth;

releasing said seam portion to slacken said seam portion;

progressively tautening said seam portion from one end to the other thereof to again deepen said seam portion to said second depth by means rolling along the length of said seam portion in progressive engagement with the interior thereof;

and progressively securing together said tautened material from one end to the other thereof immediately behind said means.

4. Apparatus for manufacturing pleated composite material, said apparatus comprising:

a frame for carrying elongated sheets of unpleated material and including a pleating area having a transverse opening;

transversely extending gathering means mounted to said frame for movement through said transverse opening and into said unpleated material to form an elongated seam portion therein overlying said gathering means;

forming means extending through said transverse opening and operative to traverse said transverse opening for progressively engaging and disengaging the interior of said seam portion along the length thereof to tauten said seam portion;

and securing means mounted to said frame and coupled with said forming means for traversing said transverse opening with said forming means to secure together said unpleated material at said seam portion contemporaneously with operation of said forming means.

5. Apparatus for manufacturing pleated composite material, said apparatus comprising:

a frame for carrying elongated sheets of unpleated material and including a pleating area having a transverse opening;

transversely extending gathering means mounted to said frame for movement through said transverse opening and into said unpleated material to form an elongated seam portion therein overlying said gathering means;

constraining means located beyond said transverse opening, adapted for normally constraining pleated material from movement toward said transverse opening, and operative to move said pleated material toward said transverse opening to provide slack in said seam portion;

forming means extending through said transverse opening and operative to traverse said transverse opening for progressively engaging and disengaging the interior of said seam portion along the length thereof to tauten said seam portion;

and securing means mounted to said frame and coupled with said forming means for traversing said transverse opening with said forming means to secure together said unpleated material at said seam portion contemporaneously with operation of said forming means.

6. Apparatus for manufacturing pleated composite material, said apparatus comprising:

a frame for carrying elongated sheets of unpleated material and including a pleating area having a transverse opening;

gathering means including a pair of parallel, transversely extending gathering elements mounted to said frame for movement through said transverse opening and into said unpleated material to form an elongated seam portion overlying said gathering means;

forming means mounted to said gathering means for movement therewith through said transverse opening, said forming means extending beyond said gathering elements to thereby form a deeper said seam portion lying thereover, said forming means having a continuous periphery whereby, upon operation of said forming means, said forming means traverses said transverse opening and said periphery progressively engages the interior of said seam portion along the length thereof to progressively tauten said seam portion;

and securing means mounted to said frame and coupled with said forming means for traversing said transverse opening with said forming means to secure together said unpleated material at said seam portion contemporaneously with tautening of said seam portion by said forming means.

7. Apparatus for manufacturing pleated composite material, said apparatus comprising:

a frame for carrying elongated sheets of unpleated material and including a pleating area having a transverse opening;

gathering means including a pair of parallel, transversely extending gathering elements mounted to said frame for movement through said transverse opening and into said unpleated material to form an elongated seam portion overlying said gathering means;

forming means mounted to said gathering means and including a disc extending between and beyond said gathering elements and operable to traverse said transverse opening and progressively roll upon the interior of said seam portion along the length thereof to progressively tauten said seam portion;

and securing means mounted to said frame and coupled with said forming means for traversing said transverse opening with said forming means to secure together said unpleated material at said seam portion contemporaneously with tautening of said seam portion by said forming means.

8. Apparatus for manufacturing pleated composite material, said apparatus comprising:

a frame for carrying elongated sheets of unpleated material and including a pleating area having a transverse opening;

gathering means including a pair of parallel, transversely extending gathering elements mounted to said frame for movement through said transverse opening and into said unpleated material to form an elongated seam portion overlying said gathering means;

forming means mounted to said gathering means and including a disc extending between and beyond said gathering elements, and further including means for rotating said disc for traversing said transverse opening and progressively rolling upon the interior of said seam portion along the length thereof to progressively tauten said seam portion;
securing means mounted to said frame and coupled with said forming means;
and means for moving said securing means along said transverse opening at a rate of travel less than the peripheral rate of travel of said forming means whereby said unpleated material is secured together at said seam portion contemporaneously with tautening of said seam portion by said forming means.

References Cited by the Examiner
UNITED STATES PATENTS

| | | | |
|---|---|---|---|
| 1,903,425 | 4/33 | Gordon | 112—151 |
| 1,918,284 | 7/33 | Mitchell | 112—2 |
| 2,132,429 | 10/38 | Mitchell | 112—2 |
| 2,382,486 | 8/45 | Kelly | 112—2 |

JORDAN FRANKLIN, *Primary Examiner.*